Aug. 19, 1952   J. H. WILLIAMS   2,607,054
CHUCKING MECHANISM FOR A TAPPING MACHINE
Filed Dec. 28, 1949   4 Sheets-Sheet 1

James Howard Williams
INVENTOR.

Harry Dexter Beck
ATTORNEY

Aug. 19, 1952   J. H. WILLIAMS   2,607,054
CHUCKING MECHANISM FOR A TAPPING MACHINE
Filed Dec. 28, 1949   4 Sheets-Sheet 3

James Howard Williams
INVENTOR.

BY Harry Dexter Reed
ATTORNEY

Aug. 19, 1952  J. H. WILLIAMS  2,607,054
CHUCKING MECHANISM FOR A TAPPING MACHINE
Filed Dec. 28, 1949  4 Sheets-Sheet 4
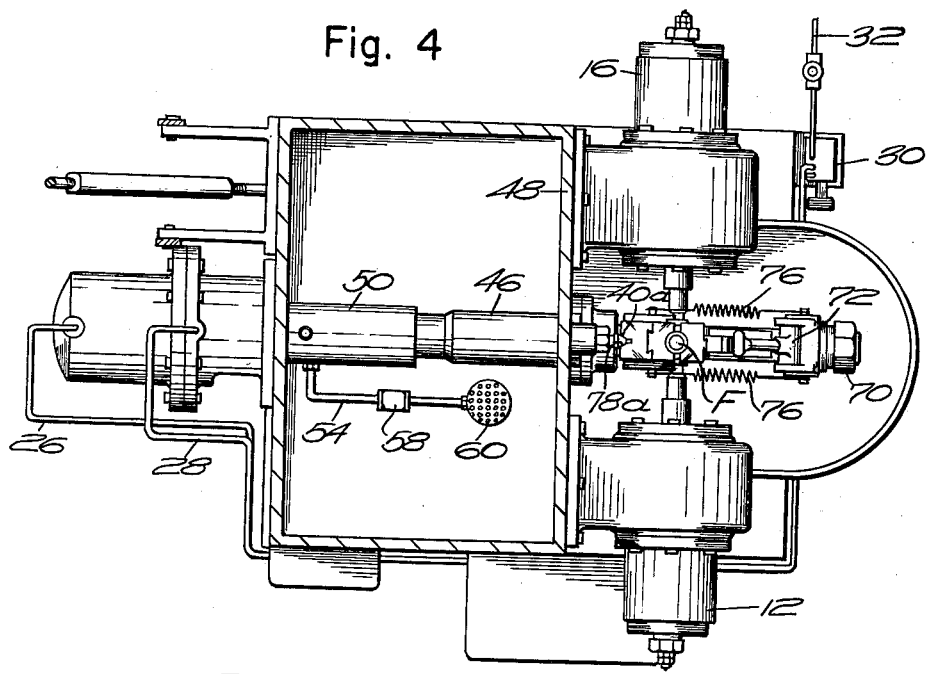
Fig. 4
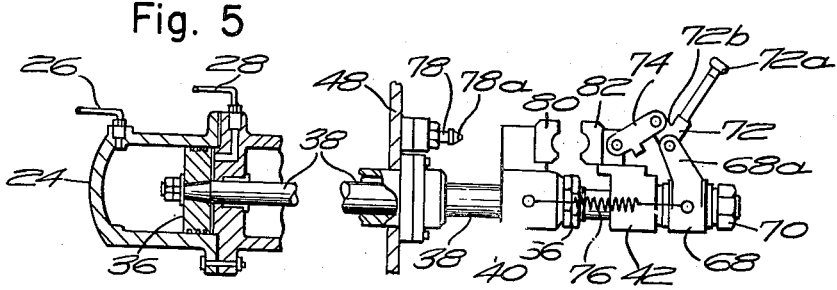
Fig. 5
Fig. 6
James Howard Williams
INVENTOR.
BY Harry Dexter Peck
ATTORNEY Patented Aug. 19, 1952

2,607,054

UNITED STATES PATENT OFFICE 2,607,054

CHUCKING MECHANISM FOR A TAPPING MACHINE

James Howard Williams, Lincoln, R. I., assignor to Grinnell Corporation, Providence, R. I., a corporation of Delaware Application December 28, 1949, Serial No. 135,370

5 Claims. (Cl. 10—107)

1

This invention relates to improvements in chucking mechanism for a tapping machine. More especially it has to do with improved means for permitting a pipe fitting to be manually placed in the chucking mechanism and a moderate holding pressure applied and thereafter applying power pressure to accurately position the fitting and hold it firmly in place while the threads are cut.

Chucking mechanisms heretofore used have been objectionable because of the loss of time required to maintain them in operating condition. This has been due in large part to the presence of numerous flat surfaces between the relatively moving parts on which surfaces the trimmings or chips from the work being cut could fall and become entrapped between the mating moving surfaces. This would cause rapid and serious wear and require frequent repairs to the mechanism.

It is a principal object of the present invention to mount certain of the parts of my improved mechanism on a single shaft which extends horizontally in the tapping machine and a portion of which underlies the point of intersection of the axis of the cutting tools. The provision of this single shaft as the guideway on which the moving parts slide presents no surfaces on which trimmings will normally remain. Such as may momentarily balance on the surface of the shaft are easily dislodged and fall below the shaft before they can work themselves in between the shaft and the parts which slide upon it or the bearings through which the shaft itself slides. It is a further object of the present invention to provide a pair of jaw members which can be manually positioned against a fitting and be so held by spring means exerting a moderate pressure on the fitting. It is a still further object to provide pressure actuated means for thereafter moving the shaft, and with it the jaw members, to position the fitting in proper alignment with the cutting tools and to maintain the fitting in said position while the tapping occurs. Upon withdrawal of the tools from the now threaded fitting, the pressure actuated means returns the jaw members to a position where the moderate holding pressure can be manually released, the threaded fitting removed from the jaw members, and an unthreaded piece of work inserted.

The best mode in which I have contemplated applying the principles of my improvements is disclosed in the accompanying drawings, but these are to be deemed primarily illustrative because it is intended that the patent shall cover by suitable expression in the appended claims whatever features of patentable novelty exist in the invention disclosed.

In the accompanying drawings:

Fig. 4 is a plan view in section as on line 4—4 of Fig. 2; and

Figs. 5 and 6 are elevations, partly in section, showing details of the chucking mechanism in different relative positions.

Referring more particularly to the drawings the tapping machine shown for purposes of illustration has a base 10 on which are mounted three tapping units 12, 14 and 16 with their respective taps 18, 20, and 22, arranged with two of them in horizontal alignment and the third one vertically disposed with its axis passing through the common horizontal axis of the other two. This is the usual arrangement of the cutting tools for tapping a pipe T but it is to be understood that my improved chucking mechanism can be employed with taping machines having movable or adjustable tappings units which can be set at angles to one another to cut 45°-elbows or fittings with their holes arranged at unusual angles to each other. Likewise my invention can be used with fittings and cutting means for cutting both internal and external threads on the fitting. In short, by providing jaws of suitable configuration to receive and properly grip a fitting, my improved chucking mechanism is capable of handling almost any pipe fitting which has to be threaded.

I have not disclosed all the details of the tapping machine apart from my improvements but it is to be understood that suitable means are present in the machine for rotating the taps in both directions of rotation and for advancing them toward and from a fitting to be threaded.

The present invention has to do with the chucking mechanism whereby the fitting is properly located and held in position for the cutting operation to be performed and is then released from the mechanism so that a fresh uncut fitting may be inserted. In Figs. 1 to 4 inclusive the chucking mechanism is shown in its position when the taps are operating upon the fitting. Fig. 5 shows the chucking mechanism in what might be called its inactive position ready to receive a fitting. Fig. 6 shows the position of the chucking mechanism after the fitting has been placed in the jaw members and the manual actuation of the mechanism has been completed.

Figure 1:
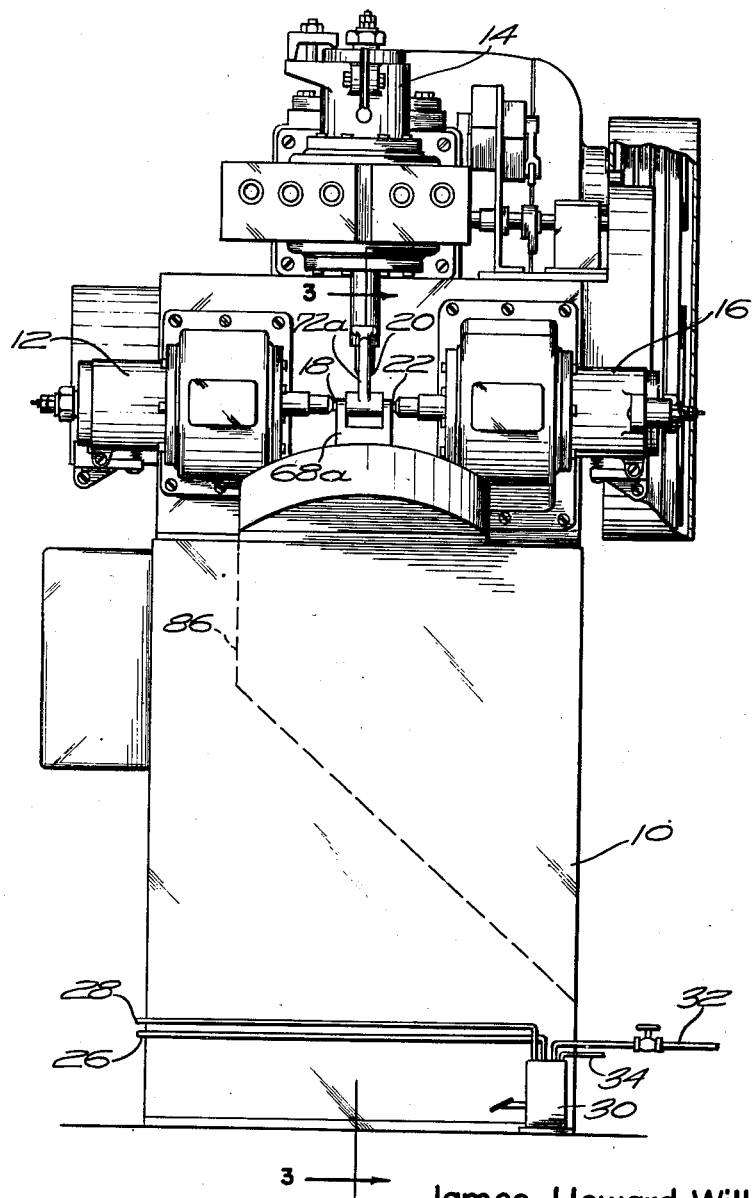
Fig. 1 is a front elevation of a tapping machine embodying my improved chucking mechanism.
Figure 2:
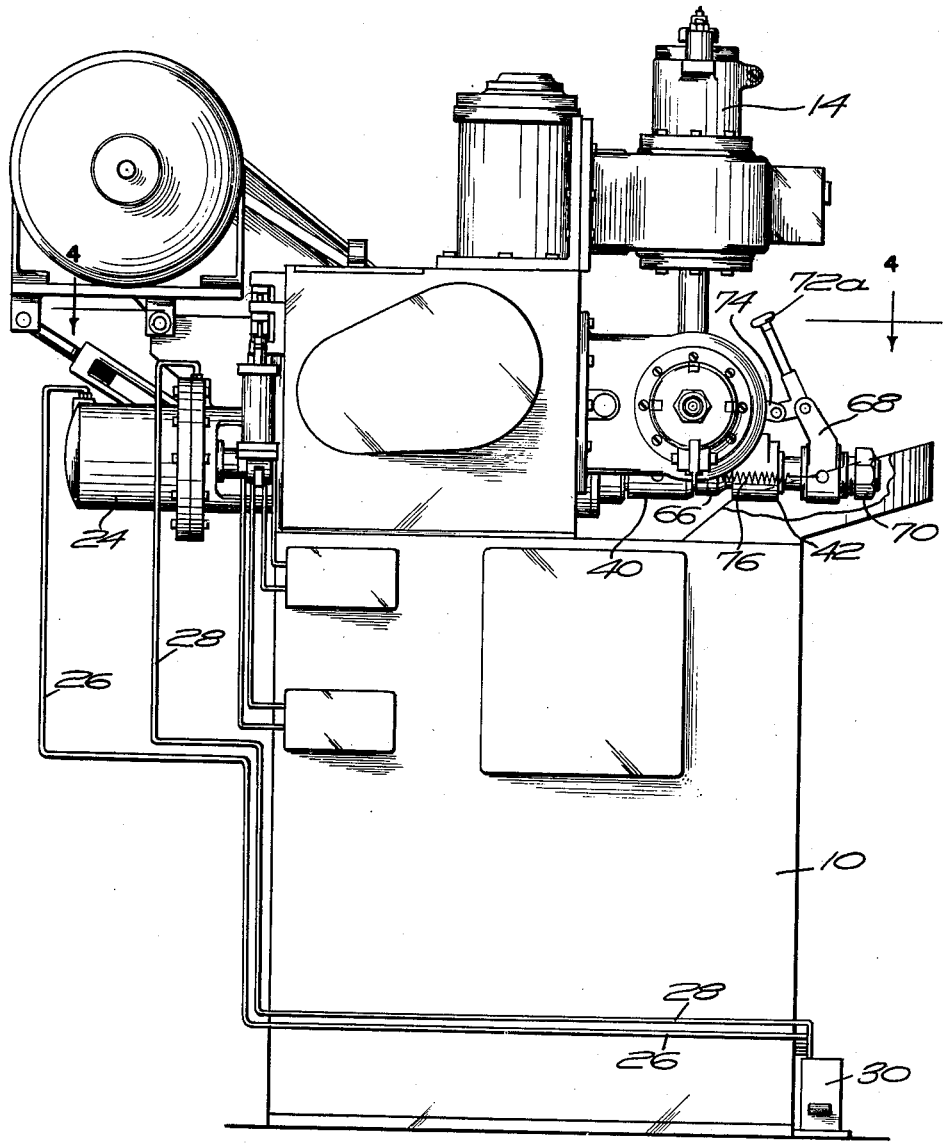
Fig. 2 is a side elevation of the same, as seen from the left in Fig. 1.
Figure 3:
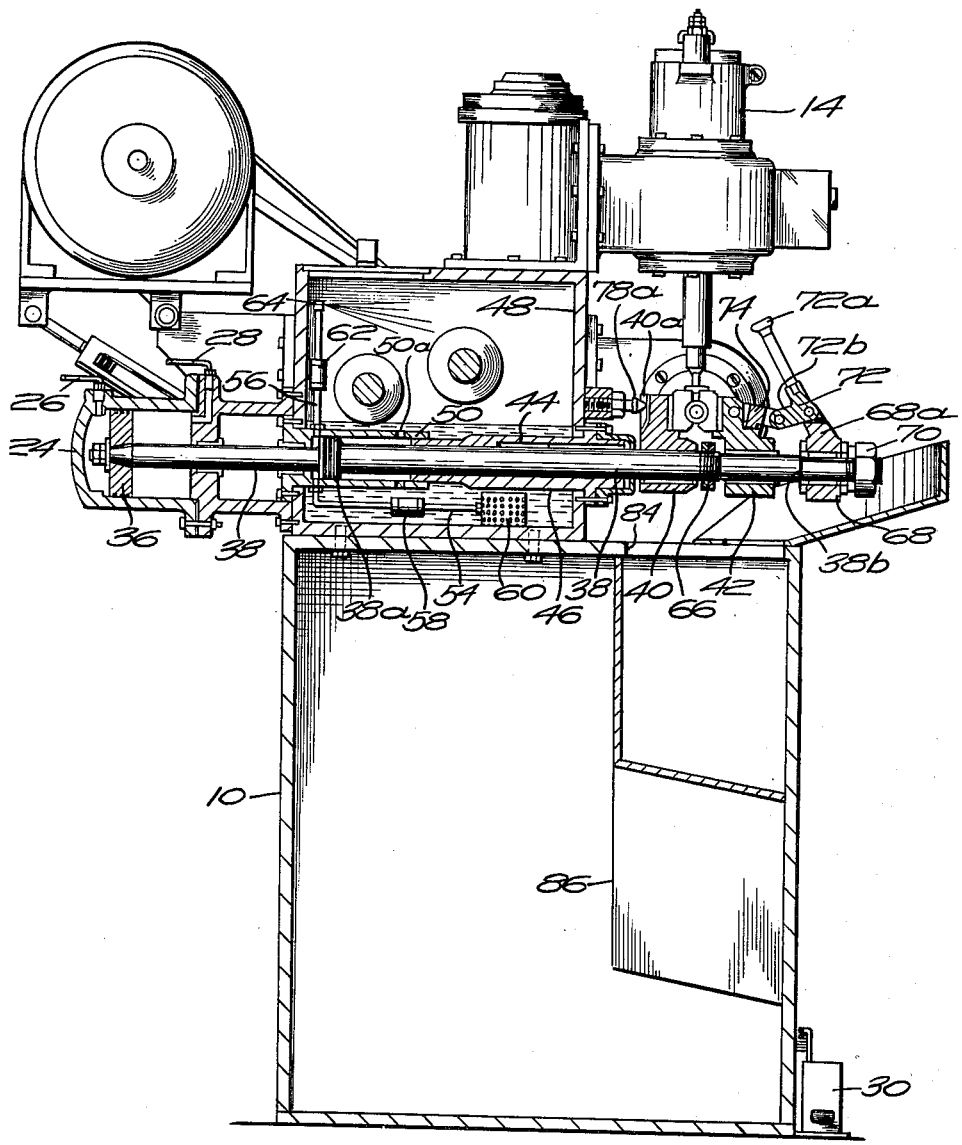
Fig. 3 is a similar elevation partly in section as on line 3—3 of Fig. 1.

Looking now at Fig. 3, a cylinder 24 is mounted at the rear of the machine and the ends thereof are connected by pipes 26 and 28 with a treadle controlled valve 30 to which air under pressure is supplied through a pipe 32 (see Fig. 1) and from which air can be released to atmosphere via a pipe 34. Within the cylinder 24 is a piston 36 from which a pison rod or shaft 38 extends horizontally forward beyond the tapping units and under the intersection of the axes of the cutting tools. Keyed to this shaft near its forward end are a pair of jaw members 40 and 42. These members are separately mounted on the shaft and can separately slide longitudinally therealong but can not rotate with respect to the shaft itself. The latter is of course movable along its longitudinal axis and may be rotated slightly about this axis because of limited free play between a key 44 which is carried by the shaft and loosely engages a slot in a cylindrical member 46 secured to a wall of a casing 48 mounted on the base 10. This member 46 constitutes a bearing for the shaft 38. As will presently appear this provision for slight rotation of the shaft 38 is an important feature in the ultimate accurate positioning of the work with respect to the cutting tools.

Rearward of the casing member 46 is another member 50 which constitutes a cylinder for a small piston 38a formed on the shaft 38. At one end of this cylinder are vent holes 50a, and at the other end are holes to receive pipes 54 and 56. The pipe 54 is connected through a check valve 58 to a strainer 60 and the other pipe 56 is connected through another check valve 62 to a distributing nozzle 64 at its upper end. When the shaft is moved forward, or to the right as seen in Fig. 3, lubricating oil is drawn from the bottom of casing 48 through the strainer 60 past the open check valve 58 and into the cylinder 50. During this stroke of the piston the check valve 62 is closed. When the piston 52 moves through its other stroke, from right to left, the check valve 58 is closed and the oil is forced upward through the pipe 56, past the now open check valve 62 to the nozzle 64 whence it is sprayed over the gears and other parts (not shown) housed within the casing 48.

The shaft 38, between the jaw members 40 and 42, has a threaded portion on which are screwed a pair of nuts 66. When these nuts are adjusted in position and tightened against one another they serve as a stop member against which the jaw member 40 can make contact. Beyond the forward jaw member 42 substantially at the end of shaft 38 is a hub 68 fixedly mounted thereon. The rearward face of this hub 68 seats against a shoulder 38b on shaft 38, being clamped thereto by a nut 70 screwed onto the end of this shaft.

This hub 68 carries an upstanding arm 68a on which is pivotally mounted a sort of bell crank lever 72 one arm of which carries a handle 72a and the other arm 72b of which is pivotally connected to a bifurcated link 74. The latter is also pivotally connected to the forward jaw member 42. This link and the bell crank lever serve as a toggle joint between the jaw member 42 and hub 68. Connected to the hub 68 and to the rear jaw member 40 on both sides thereof, are tension springs 76 which always tend to move the rear jaw member toward the hub (Figs. 4–6).

The rear face of the jaw member 40 is provided with a centering slot 40a and on the casing 48 is mounted a centering pin 78 having a cam-shaped end 78a of a size and shape to engage nicely the side walls of the slot 40a. This pin not only acts as a stop for the jaw members so that the axis of the holes in a fitting will be in the plane defined by the axes of the taps but the engagement of the cam-shaped end of the pin with the cam-shaped slot 40a can cause sufficient rotation of the jaw members to bring these several axes into perfect alignment.

The operation of the chucking mechanism is as follows. With the treadle actuated valve 30 so positioned that the air pressure is effective on the rearward face of the piston 36, the movable parts of the chucking mechanism will be in the positions shown in Fig. 5. The handle 72a is held in its forward position which means that the arm 72b and the link 74 are inclined upwardly and hence the forward jaw member 42 is in its most forward position against the hub 68. The rearward jaw member 40 is against the stop nuts 66 being held in that position by the pull of the springs 76. The jaws 80 and 82 are accordingly in their wide open position ready to receive a fitting.

A fitting F is manually placed in the space between the open jaws and the handle 72a is then pushed rearward. This swings the arm 72b of the bell crank lever and the link 74 downward and causes the forward jaw 82 to push against the fitting and bring the latter against the rearward jaw 80. As the toggle joint continues to swing downward the rearward jaw 80 and the jaw member 40 are moved along the shaft 38 away from the stop nuts 66. This permissible relative movement of the jaws enables them to engage the work suitably despite such minor variations as may occur between one fitting and another. When the toggle joint reaches the end of its downward swing with the bell crank arm 72b and the link 74 both inclined below the horizontal, as seen in Fig. 6, the fitting is held in the jaws by the moderate pressure exerted by the springs 76. In this position the fitting is still forward of the cutting tools which must enter the holes in the fitting.

The position of the treadle valve 30 is now changed to permit the air in the cylinder on the rearward side of the piston 36 to escape via the pipes 26 and 34, and the pressure supply from pipe 32 to pass through pipe 28 into cylinder 24 and become effective on the forward side of the piston 36. As the piston moves rearward, pulling the shaft 38 with it, the fitting is likewise moved rearward because the hub 68 and jaw members 40 and 42 move with the shaft, the force being transmitted from the hub 68 to the jaw member 42 and from the latter to the other jaw member 40 by the fitting F.

When the rearward jaw member 40 reaches the pin 78, the engagement between the cam-shaped end 78a of the later and the walls of the centering slot 40a causes the jaw-members, the jaws and the shaft 38 to rotate if the hole or holes in the fitting are not in alignment with the taps. This slight rotation of the movable parts lines up the fitting so that its holes are accurately positioned with respect to the taps when the pin 78 stops further rearward movement of the jaw members. The fitting is thus held very firmly in its proper position while the tapping operation is performed because the full effect of the pressure on the piston 36 is transmitted by the shaft 38, the nut 70, the hub 68, the bell crank lever 72 and the link 74 to the forward jaw member 42, while the rearward jaw member 40 is seated against the fixed pin 78. Thus the full force of the pressure is effective to clamp the fitting tightly between the jaws.

After the holes in the fitting have been tapped and the taps withdrawn, the position of the treadle valve 30 is again shifted so that pressure is applied to the rearward face of piston 36. This causes the shaft 38 to move forward and of course removes the heavy holding pressure on the fitting. The latter is not released, however, because the pull of the springs 76 is still effective to hold the jaw 80 against the fitting. To release the fitting the operator swings the handle 72a forward to shift the jaw member 42 against the hub 68 while the rear jaw member, still under the pull of the springs 76, brings up against the stop nuts 66. The jaws thereupon separate allowing the fitting to drop through a hole 84 in the top of the base 10 and slide down a chute 86 to a box or basket outside the machine. The parts of the chucking mechanism are again in the relative positions shown in Fig. 5, ready to receive another uncut fitting.

Looking at Fig. 4 especially, it is obvious that substantially all of the shaft 38 outside of its bearing 46 is covered by the jaw members, the toggle joint (72—74) and the hub 68. Consequently very little of the trimmings from the fitting can fall directly on the shaft, and such as do reach the shaft are met with a surface from which they normally slide off and pass downward through the hole 84. Accordingly practically none of the trimmings can work their way between the shaft and the other elements which are slidable with respect thereto. This results in no undue wear and materially reduces the time lost in the shut-down of the machine heretofore experienced where the trimmings can work in between relatively moving parts and cause excessive wear.

The initial moderate pressure imposed on the fitting by the springs 76 allows the fitting to adjust itself to the configuration of the jaws so that when the latter are finally positioned by the engagement of the centering pin 78 and the centering slot 40a the fitting will be accurately placed with respect to the cutting tools.

I claim:

1. Chucking mechanism for a tapping machine comprising a movable shaft; pressure actuated means for moving said shaft forwardly or rearwardly with respect to the cutting tools of said machine; a forward and a rearward jaw member mounted on said shaft for movement therealong; work engaging jaws carried by said jaw members; means for moving said jaw members with respect to one another for engaging a piece of work between them; means on said shaft for engaging said forward jaw member to effect movement of both said jaw members and the work piece rearward with said shaft; an adjustable centering stop mounted on the frame of said machine; and a centering slot in the rearward jaw member adapted to engage said stop and by the last said engagement effect the accurate positioning of said work piece with respect to the cutting tools.

2. Chucking mechanism for a tapping machine comprising a movable shaft; pressure actuated means for moving said shaft rearwardly and forwardly with respect to the cutting tools of said machine; a forward and a rearward jaw member mounted on said shaft and movable therealong; a hub member secured to said shaft forwardly of said forward jaw member; means interposed between said hub member and said forward jaw member for moving said forward jaw member along the said shaft toward one side of the work; spring means for holding the rearward jaw member against the other side of said work; and centering means mounted on the frame of the machine and engageable by the rearward jaw member upon movement of the shaft and jaw members rearwardly by the said pressure actuated means for accurately positioning said work with respect to the cutting tools.

3. Chucking mechanism for a tapping machine comprising a pressure actuated shaft extending below the intersection of the axes of the cutting tools of said machine; a forward jaw member and a rearward jaw member individually slidably mounted on said shaft for holding the work to be tapped; manually actuated means providing an unyielding connection between the forward jaw member and said shaft; spring means urging the rearward jaw member toward the forward jaw member for lightly holding the work between said jaw members before said work is positioned with respect to said cutting tools; and travel limiting means mounted on the frame of the machine and engageable by the rearward jaw member for limiting the rearward travel of said rearward jaw member so that the force exerted rearwardly by the pressure actuated shaft urges the forward jaw member toward the rearward jaw member and thereby holds the work therebetween firmly during the tapping operation.

4. Chucking mechanism for a tapping machine comprising a movable shaft located with its axis below the point of intersection of the axes of the cutting tools of said machine; forward and rearward jaw members keyed to said shaft and slidable therealong; each having a jaw suitably shaped to clamp a fitting between them; a hub member secured to the shaft; spring means connecting said hub member with and tending to urge said rearward jaw member forwardly toward said forward jaw member; a stop on said shaft intermediate said jaw members for limiting the forward travel of said rearward jaw member along said shaft; a manually actuated toggle joint interposed between said hub member and said forward member for moving said forward jaw member along said shaft toward said rearward jaw member to engage a fitting between them and move said rearward jaw member away from said stop so that the fitting is held between the jaw member under the force exerted by said spring means; pressure actuated means for moving said shaft and jaw members rearward; an adjustable stop having a cam-shaped end mounted on the frame of the machine in the line of travel of the rearward jaw member; and a cam-shaped slot on said rearward jaw member adapted to engage said cam-shaped stop and by said engagement insure the proper positioning of the fitting with respect to the cutting tools; the said fitting being held firmly in place during the cutting operation.

5. Chucking mechanism for a tapping machine comprising a movable shaft located with its longitudinal axis below the intersection of the axes of the cutting tools of said machine; a pair of jaw members slidably but non-rotatably mounted on said shaft each having a jaw suitably shaped to engage a fitting between them; a hub member fixed on said shaft; a toggle joint interposed between said hub member and one of the jaw members for moving the last said jaw member toward the other jaw member; spring means connected to said hub member and to said other jaw member exerting a moderate force on said other jaw member in direction to move it toward the fitting, the said spring means and said toggle joint coacting to impose a moderate pressure on the fitting by the jaws; means for applying force to said shaft to move it along its said longitudinal axis; and a centering stop mounted on the fixed frame of the machine and arranged to be engaged by the said other jaw member and arrest the movement of said shaft and other movable members with the fitting in position to be engaged by the taps.

JAMES HOWARD WILLIAMS.

REFERENCES CITED

The following references are of record in the file of this patent:

UNITED STATES PATENTS

| Number | Name | Date |
|---|---|---|
| 971,979 | Evans | Oct. 4, 1910 |
| 2,402,411 | Kent | June 18, 1946 |